(12) United States Patent
Schalz

(10) Patent No.: US 6,243,197 B1
(45) Date of Patent: Jun. 5, 2001

(54) LIGHTING DEVICE FOR A MICROSCOPE

(75) Inventor: Karl-Josef Schalz, Weilburg (DE)

(73) Assignee: Leica Mikroskopie und Systeme GmbH, Wetzlar (DE)

( * ) Notice: Subject to any disclaimer, the term of this patent is extended or adjusted under 35 U.S.C. 154(b) by 0 days.

(21) Appl. No.: 09/091,424

(22) PCT Filed: Oct. 24, 1997

(86) PCT No.: PCT/DE97/02477

§ 371 Date: Jul. 24, 1998

§ 102(e) Date: Jul. 24, 1998

(87) PCT Pub. No.: WO98/19198

PCT Pub. Date: May 7, 1998

(30) Foreign Application Priority Data

Oct. 25, 1996 (DE) .............................. 196 44 662

(51) Int. Cl.$^7$ .............................. G02B 21/06; G02B 21/00
(52) U.S. Cl. .......................... 359/388; 359/368; 359/370; 359/387
(58) Field of Search .................... 359/368–371, 359/385–390

(56) References Cited

U.S. PATENT DOCUMENTS

| | | | |
|---|---|---|---|
| 3,679,287 | * 7/1972 | Takahashi et al. | 359/388 |
| 4,407,569 | * 10/1983 | Piller et al. | 359/387 |
| 4,561,731 | 12/1985 | Kley | 359/370 |
| 4,795,256 | * 1/1989 | Krause et al. | 356/320 |
| 4,806,776 | 2/1989 | Kley | 250/560 |
| 4,852,985 | 8/1989 | Fujihara et al. | 359/385 |
| 4,907,158 | * 3/1990 | Kettler et al. | 364/413.01 |
| 5,521,705 | * 5/1996 | Oldenbourg et al. | 356/368 |

FOREIGN PATENT DOCUMENTS

| | | | |
|---|---|---|---|
| 2421866 | 11/1974 | (DE) | . |
| 3108389 | 4/1982 | (DE) | . |
| 37 34 691 | 4/1988 | (DE) | . |
| 4102508 | * 8/1991 | (DE) | 359/385 |
| 0482340 | 4/1992 | (EP) | . |
| 59-111124 | * 6/1984 | (JP) | 359/385 |
| 61-156215 | * 7/1986 | (JP) | 359/385 |
| 63-14115 | * 1/1988 | (JP) | 359/385 |
| 5-333272 | * 12/1993 | (JP) | 359/370 |

* cited by examiner

Primary Examiner—Thong Nguyen
(74) Attorney, Agent, or Firm—Foley & Lardner

(57) ABSTRACT

A description is given of an illuminating device for a microscope (1), having a light source (2), an illuminating optical system (3) and an LCD (5) arranged in the illuminating beam path (4). The illuminating light is directed onto the object (6) from the light source (2) via the LCD (5), a transparent/opaque pattern being generated on the LCD (5) by means of a control and calculating device (7). The LCD (5) is arranged in a plane (AP') which is conjugate with respect to the field diaphragm plane or aperture diaphragm plane (AP) and has a planar matrix composed of individual pixels arranged next to one another and of the same dimensions, the pixels each being constructed such that they can be driven individually to generate an arbitrary transparent/opaque pattern. The control and calculating device (7) is constructed as a computer with a graphics card. The graphics card generates the image signal for driving the LCD (5), it being possible for the image generated on the LCD (5) to be represented simultaneously on a separate monitor (8).

29 Claims, 3 Drawing Sheets

LIGHTING DEVICE FOR A MICROSCOPE

BACKGROUND OF THE INVENTION

1. Field of Invention

The invention relates to an illuminating device for a microscope.

In the illuminating beam path, the illuminating device for a microscope contains a lamp, an illuminating optical system and mechanical diaphragms. The size and shape of the diaphragms must be respectively matched to the objective used and to the desired type of illumination. The practice of automatically driving the variable quantities has been adopted for this reason. The mechanical diaphragms and filters in the microscope have therefore being equipped in each case with an electric drive or actuator and with a control device. This type of drive involves a high mechanical and electrical outlay because of the multiplicity of the diaphragms and filters used in connection with the most varied types of microscopic illumination.

2. Description of Related Art

DE 31 08 389 A1 has disclosed an illuminating device for a microscope in which a drivable liquid crystal cell with defined structure is used as a mechanical diaphragm. Differently instructed liquid crystal cells are used in each case for the various types of illumination, such as reflected-light/transmitted-light illumination, oblique illumination, darkfield illumination, phase-contrast illumination and polarization illumination.

Because the electrodes of the respective cell have definitively prescribed structures, they can be used only for prescribed magnification ratios in the microscope. In the event of a change in magnification owing to the use of a different microscope objective, it is necessary to install in the microscope a different liquid crystal cell matched thereto. Moreover, setting various types of illumination requires the various liquid crystal cells to be interchanged with one another. The defined structures mean that the type of illumination can be changed only with a change in hardware.

The drive specified in this document is a computer which is connected to the liquid crystal cell via a special control circuit and through which current can be applied to the prescribed structures of the cell.

A planar light source made from individual LEDs arranged next to one another is disclosed in DE 37 34 691 A1. The LEDs are constructed to be drivable individually and replace the halogen lamp normally used. A disadvantage of this arrangement is that the relatively weakly shining LEDs provide only a limited quantity of light for the microscope illumination. Moreover, such self-illuminating LEDs are relatively large, with the result that only a relatively coarse resolution can be achieved by various diaphragms in the representation.

SUMMARY OF THE INVENTION

It is therefore the object of the invention to develop the known prior art such that the most varied types of illumination can be realized using a single controllable cell.

This object is achieved according to the invention by means of the features specified herein. Advantageous developments of the invention are the subject matter described below.

Either Köhler or critical illumination is realized by the arrangement of a liquid crystal display (hereafter LCD), which has a planar matrix with individually drivable pixels, in a plane which is conjugate with respect to the field diaphragm or aperture diaphragm. The most varied transparent/opaque patterns, and thus the most varied diaphragm shapes and diaphragm sizes, can be generated by means of the individually drivable pixels, for example using a computer.

In this case, the diaphragm generated can be represented simultaneously on a monitor connected to the computer. It has also proved to be advantageous if the computer is connected to the control device of the microscope for the purpose of data exchange. It is then thereby possible, for example, to relay the data for the control program via the objective just used, and to determine the required diaphragm size and diaphragm shape by means of the control program loaded in the computer.

Using a commercially available video projector with LCD or DLP (Digital Light Technology) as illuminating device on the microscope means that the most varied types of illumination can be implemented without the need for the previously customary mechanical matching of diaphragms, filters or the like. The mechanical diaphragms, filters, phase rings and the like previously used in the microscope can therefore be completely eliminated.

The commercially available video projectors, for example Sony CPJ-PC200E or InFocus SYSTEMS LitePro620, can be flanged to the microscope stand via a simple illuminating optical system, and can replace both the customary light source and the diaphragms and filters. The video projector can be driven by connecting the existing standardized video input, for example VGA, SVGA, PAL, SECAM, NTSC, RGB to the corresponding output of a video card of a computer.

When using a video projector for color LCD, the color of the illuminating light can be set via the video signal. In this case, it is even possible in a simple way to produce simultaneously differing colors at different points of the LCD, or to arrange for the brightness of the illuminating light in the microscope to differ at the various points.

Commercially available equipment can be used in this case as the video card and computer. A PC or portable computer with built-in video card suffices to drive the video projector. In this case, the video card can be connected both to the video projector and to a further monitor for representing the transparent/opaque pattern set.

Owing to the representation of the microscopic image of the object via a TV camera and a connected TV monitor, with the change in the image on the LCD the resulting change in the microscope image is advantageously visible on the TV monitor. The desired representation of the object image can therefore be set by a stepwise change to the illumination via the LCD image.

In the case of such TV adapters or TV cameras for observing the microscopic image, color shading is produced at the image edge with 3-chip video cameras. The shading results from the dispersion at the prisms inside the cameras. When the LCD image is generated, said color shading is already taken into account for the illumination. In this case, the LCD generates an image appropriately color-corrected at the edge, or in the case of critical illumination an appropriate limitation of the aperture is undertaken. Positionally dependent color shading in the illumination can thus be corrected appropriately in a relatively simple way. In the case of Köhler illumination, the light intensity decreases towards the edge for large fields. The LCD illumination device can be used to compensate this decreasing light intensity by means of an "inverse" diaphragm image on the LCD. The brightness then increases towards the edge in the case of such a diaphragm image on the LCD.

This function can, of course, be fully automated in a further refinement of the invention. A TV camera is then used, for example, to generate a video signal in which the drop in brightness towards the image edge is contained. The appropriate computer regulating device is used to measure the drop in brightness, and the inverse image signal is correspondingly generated. This correction can advantageously always be performed automatically when, for example, there is a need to change the illuminating aperture.

In a further refinement of the invention, the computer is connected to further computers via a network, as a result of which the illumination conditions can be remotely controlled. This is useful, in particular, in seminar rooms with several microscopes, for example in order to create the same illumination conditions overall during a teaching session. Said network can then also be used, of course, for remote control of the further microscope functions.

It has also proved to be advantageous if additional orientation and/or graphic characters can be faded into the microscopic beam path via the LCD. Said fading-in can also be performed together with the representation of the diaphragms for the illumination on the LCD.

Owing to the use of a video projector, the switching over to another type of illumination or another diaphragm is performed without moving masses. It is thereby also possible to change different diaphragms and types of diaphragm at the alternating frequency of the video signal, for example. This "stroboscopic effect" for microscope illumination can then be used, for example, to analyze the movement of moving objects such as living cells under the microscope, for example when taking photographs.

BRIEF DESCRIPTION OF THE DRAWINGS

The invention is explained in more detail with reference to an exemplary embodiment with the aid of diagrammatic drawing, in which.

DETAILED DESCRIPTION OF PREFERRED EMBODIMENTS

Figure 1:
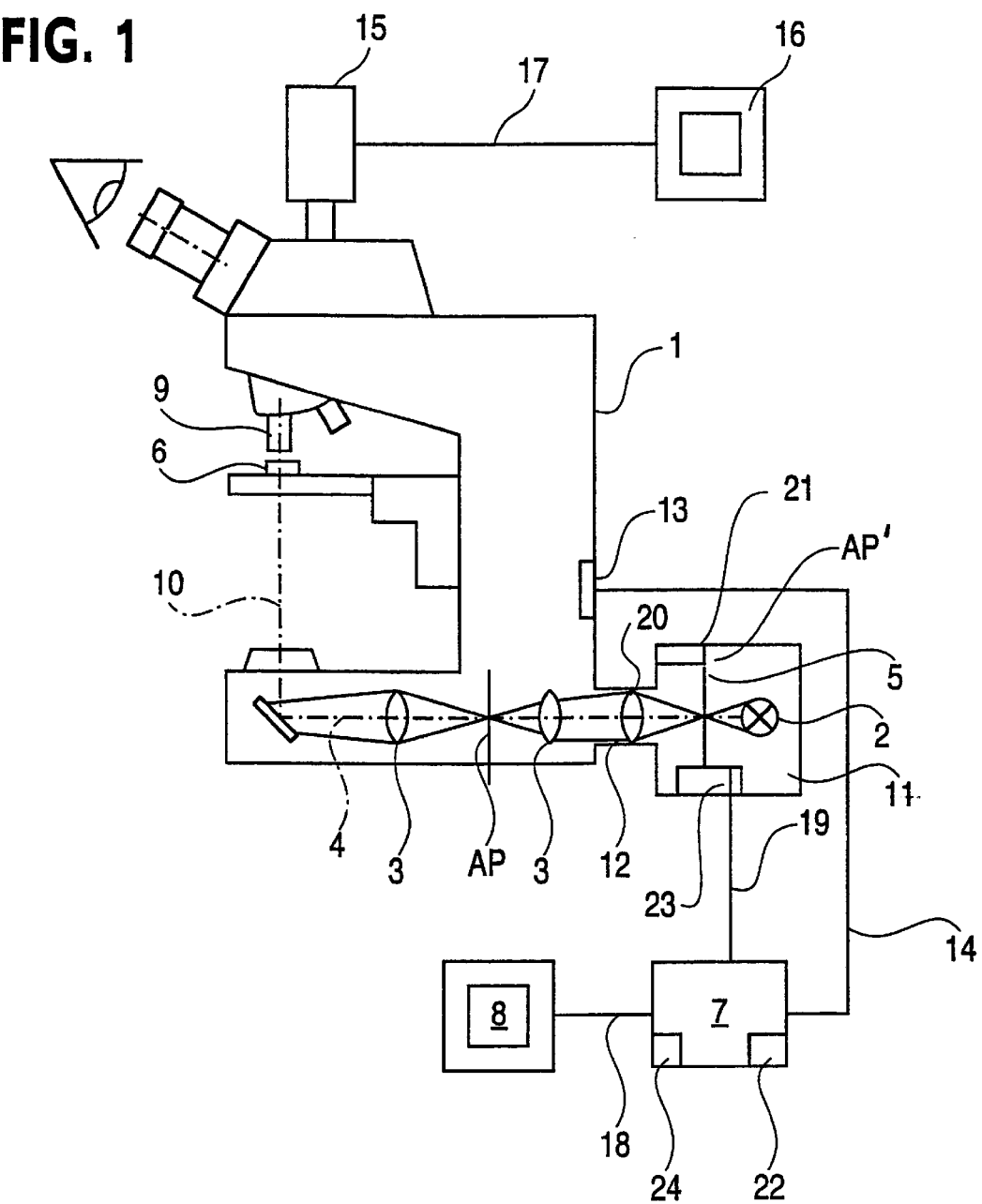
FIG. 1 shows a view of the microscope with video projector connected.

FIG. 1 shows a microscope 1 having an objective 9 and an object 6. A microscope 1 has an illuminating beam path 4 with an illumination axis 10 on which an illuminating optical system 3 and an aperture diaphragm plane AP are provided. A housing 11 of a video projector is connected to the microscope 1 via a coupling device 12 with a matching optical system 20. An LCD 5 which is illuminated by a light source 2 is arranged in the housing 11 in a plane AP' which is conjugate with respect to the aperture diaphragm plane AP. The LCD 5 is connected to a control/calculating device 7 via an LCD drive device 23 integrated in the housing 11 and a video cable 19. A monitor cable 18 provides an electric connection between the control/calculating device 7 and a monitor 8.

An audio unit 21 is also integrated in the housing 11.

The control/calculating device 7 is also connected to the control device of the microscope 1 via a dataline 14 and an interface 13 for the purpose of data transmission. Also integrated in the control/calculating device 7 is a network terminal 22 via which both the illuminating device and all further microscope functions are constructed to be capable of remote control. Also arranged on the microscope 1 is a TV camera 15 for transmitting the image of the object 6 via a TV cable 17 to a TV monitor 16.

The appropriate transparent/opaque pattern can be generated on the LCD 5 under menu control by means of a control program loaded in the control/calculating device 7 which further includes a graphic card 24. This pattern is represented simultaneously via the monitor 8. A WINDOWS surface can be used, for example, as a surface for the loaded control program, as a result of which all the parameters to be changed can be set by controlling a mouse in an ergonomically favorable way.

Figure 2:
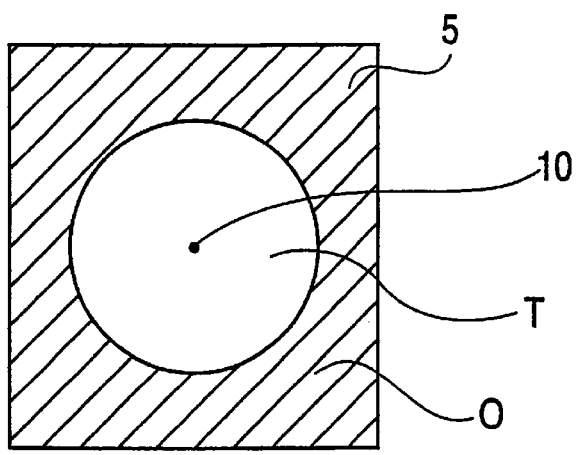
FIG. 2 shows a first image generated on the LCD.

FIG. 2 shows the LCD 5 with the illumination axis 10 arranged in the middle. A circular image containing transparent (T) and opaque (O) regions is represented on the LCD 5. This setting corresponds to the opening of an aperture diaphragm or field diaphragm.

Figure 3:
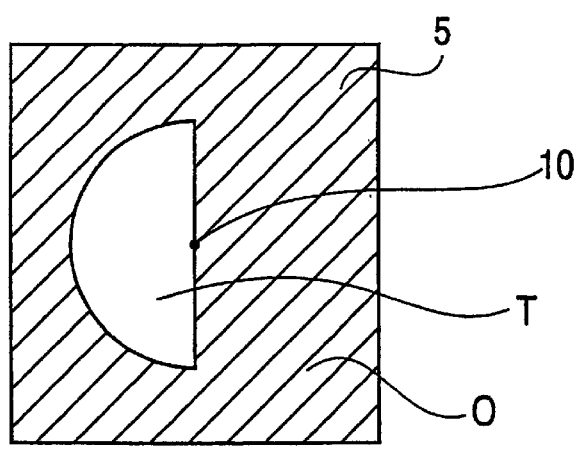
FIG. 3 shows a second image generated on the LCD.

FIG. 3 shows the LCD 5 with an image contained a transparent (T) semicircle, in which the image is used to set the oblique type of illumination in the microscope.

Figure 4:
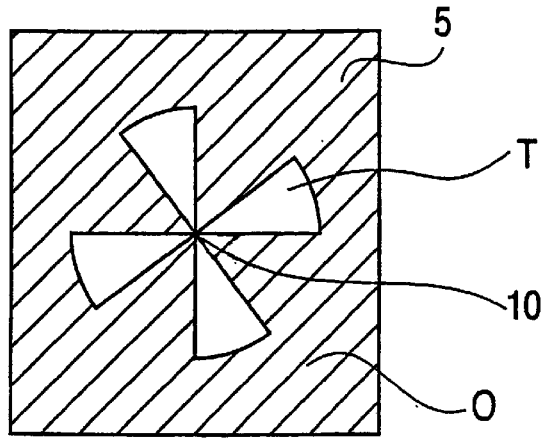
FIG. 4 shows a third image generated on the LCD.

FIG. 4 shows the LCD 5 with an image containing several transparent (T) circular segments, where the individual segments can be colored differently. This type can likewise be used for oblique illumination in the microscope.

Figure 5:
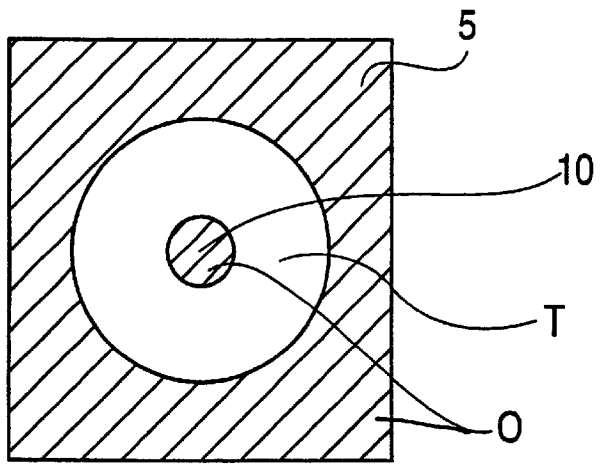
FIG. 5 shows a fourth image generated on the LCD.

FIG. 5 shows the LCD 5 with an opaque circle (O) arranged on the illumination axis 10, and a transparent ring (T) arranged around the circle. This diaphragm is used to set a dark-field illumination in the microscope.

Figure 6:
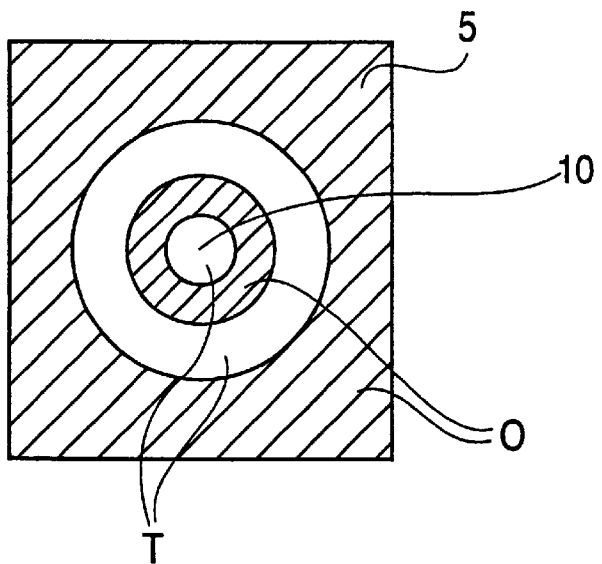
FIG. 6 shows a fifth image generated on the LCD.

FIG. 6 shows the LCD 5 with a transparent circle (T) provided on the illumination axis 10, and an opaque ring (O) arranged around the circle. This diaphragm can be used, for example, for phase-contrast illumination in the microscope.

Figure 7:
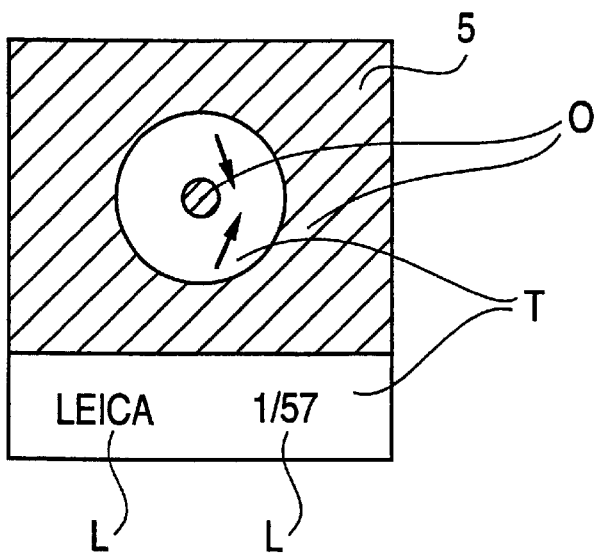
FIG. 7 shows an LCD used to represent graphic and/or orientation characters.

FIG. 7 shows an LCD 5 used to represent additional orientation and/or graphic characters, for example arrows A and characters L.

The exemplary embodiment has been described in conjunction with a video projector with integrated LCD. However, the invention is not restricted to video projectors with an LCD; rather, it is also possible, of course, to use differently constructed video projectors. These are, for example, video projectors using DLP (Digital Light Processing) technology, which operate on the basis of reflection with the aid of moving microscope mirrors.

Furthermore, other materials which can be influenced electrically and/or magnetically can also be used instead of an LCD. Said materials can be polymeric plastics, such as polyimides, for example, which change their optical properties when driven appropriately.

It is within the scope of the invention to operate the described illuminating device using reflected light at the microscope, it being possible to use known switching means such as folding deflecting mirrors to implement optional reflected-light/transmitted-light illumination at the microscope as well.

LIST OF REFERENCE SYMBOLS

1—Microscope
2—Light source

3—Illuminating optical system
4—Illuminating beam path
5—LCD
6—Object
7—Control/calculating device
8—Monitor
9—Objective
10—Illumination axis
11—Housing
12—Coupling device
13—Interface
14—Data line
15—TV camera
16—TV monitor
17—TV cable
18—Monitor cable
19—Video cable
20—Matching optical system
21—Audio unit
22—Network terminal
23—LCD control device AP—Aperture diaphragm plane
AP'—Conjugate aperture diaphragm plane

What is claimed is:

1. Illuminating device for a microscope, comprising:
a light source,
an illuminating optical system,
a liquid crystal display (LCD) arranged in an illuminating beam path, wherein an illuminating light is directed from the light source via the LCD onto an object,
a control and calculating device for driving the LCD, wherein a transparent/opaque pattern is generated on the LCD, wherein the LCD is arranged in a plane (AP') which is conjugate with respect to a field diaphragm plane or aperture diaphragm plane (AP), and the LCD has a planar matrix composed of individual pixels arranged next to one another and of the same dimensions, the pixels each being constructed such that they can be driven individually to generate an arbitrary transparent/opaque pattern, wherein the control and calculating device is constructed as a computer with a graphic card, and the graphic card generates an image signal for driving the LCD, and wherein an image generated on the LCD is represented simultaneously on a separate monitor.

2. Illuminating device for a microscope according to claim 1, wherein the LCD is constructed as a color LCD.

3. Illuminating device for a microscope according to claim 1, wherein in order to produce Köhler illumination the control/calculating device is used to generate on the LCD a transparent/opaque pattern matched to an objective used, and said pattern is projected onto the aperture plane (AP) by means of the illuminating optical system.

4. Illuminating device for a microscope according to claim 3, wherein an image consisting of individual pixels, arranged on an illumination axis of the illuminating beam path and of transparent and circular construction is generated as the transparent/opaque pattern on the LCD.

5. Illuminating device for a microscope according to claim 3, wherein an image consisting of individual pixels, arranged on an illumination axis of the illuminating beam path and of opaque and circular construction is generated as the transparent/opaque pattern on the LCD.

6. Illuminating device for a microscope according to claim 3, wherein an image consisting of individual pixels, arranged on an illumination axis of the illuminating beam path and having at least one circular segment is generated as the transparent/opaque pattern on the LCD.

7. Illuminating device for a microscope according to claim 3, wherein an image consisting of individual pixels, arranged on an illumination axis of the illuminating beam path and having individual annular opaque regions is generated as the transparent/opaque pattern on the LCD.

8. Illuminating device for a microscope according to claim 3, wherein an image with a light intensity increasing toward the edge is generated on the LCD in order to compensate a drop in brightness in an observed image.

9. Illuminating device for a microscope according to claim 8, further comprising:
a TV camera arranged on the microscope, to generate a video signal of the observed image, and to detect the drop in brightness of the observed object, wherein said signal is fed via the control and calculating device for automatically compensating the drop in brightness.

10. Illuminating device for a microscope according to claim 1, wherein in order to produce critical illumination the control/calculating device is used to generate on the LCD a transparent/opaque pattern matched to an objective used, and said pattern is projected onto the field diaphragm plane by means of the illuminating optical system.

11. Illuminating device for a microscope according to claim 10, wherein an appropriately color matched, positionally-dependent signal is provided to compensate existing color errors in the observed image on the LCD, and wherein a transparent/opaque pattern with a color temperature differing as a function of position is generated on the LCD via the control and calculating device.

12. Illuminating device for a microscope according to claim 1, wherein the light source and the LCD are constructed as a separate assembly.

13. Illuminating device for a microscope according to claim 12, wherein the assembly is arranged in a separate housing.

14. Illuminating device for a microscope according to claim 13, wherein the microscope has a coupling device for the housing.

15. Illuminating device for a microscope according to claim 12, wherein a commercially available video projector is used as the separate assembly.

16. Illuminating device for a microscope according to one of claim 12, wherein the assembly is equipped with an audio unit.

17. Illuminating device for a microscope according to claim 16, wherein the audio unit can be driven via the control/calculating device.

18. Illuminating device for a microscope according to claim 1, wherein the LCD is additionally used to represent graphic and/or orientation characters.

19. Illuminating device for a microscope according to claim 1, wherein a brightness or color temperature of the illuminating light can be set via the LCD.

20. Illuminating device for a microscope according to claim 1, wherein a different type of illumination can be set by means of a frame frequency of the image signal.

21. Illuminating device for a microscope according to claim 1, wherein generated transparent/opaque patterns are generated sequentially in time at different points on the LCD via the control/calculating device.

22. Illuminating device for a microscope according to claim 1, wherein the microscope has an electronic-interface.

23. Illuminating device for a microscope according to claim 22, wherein the control/calculating device is connected to the microscope via the interface.

24. Illuminating device for a microscope according to claim 22, wherein the microscope is connected to a network for external control.

25. Illuminating device for a microscope according to claim 24, wherein the illumination can be set for at least one microscope via the network.

26. Illuminating device for a microscope according to claim 25, wherein the microscope receives an additional illumination control command via the network.

27. Illuminating device for a microscope according to claim 1, wherein the illuminating device is operated at the microscope using transmitted light.

28. Illuminating device for a microscope comprising:

a light source;

an illuminating optical system;

a digital mirror device (DMD) arranged in an illuminating beam path; wherein illuminating light is directed from the light source via the DMD onto an object; and a controller for driving the DMD, wherein a transparent/opaque pattern is generated on the DMD, wherein the DMD is arranged in the plane (AP') which is conjugate with respect to a field diaphragm plane or aperture diaphragm plane (AP), wherein the DMD has a planar matrix composed of individual pixels arranged next to one another and of the same dimensions, the pixels each being constructed such that they can be driven individually to generate an arbitrary transparent/opaque pattern, wherein the controller is a computer with a graphic card, wherein the graphic card generates an image signal for driving the DMD, and wherein an image generated on the DMD is represented simultaneously on a separate monitor.

29. Illuminating device for a microscope comprising:

a light source;

an illuminating optical system;

a polymer material responsive to electrical or magnetic signals arranged in an illuminating beam path, wherein illuminating light is directed from the light source via the polymer material onto an object; and a controller for driving the polymer material, wherein a transparent/opaque pattern is generated on the polymer material, wherein the polymer material is arranged in the plane (AP') which is conjugate with respect to a field diaphragm plane or aperture diaphragm plane (AP), wherein the polymer material is constructed such that the polymer material can be (AP), wherein the polymer material is constructed such that the polymer material can be driven to generate an arbitrary transparent/opaque pattern, wherein the controller is a computer with a graphic card, and the graphic card generates an image signal for driving the polymer material, and wherein an image generated on the polymer material is represented simultaneously on a separate monitor.

* * * * *